(12) United States Patent
Jeon et al.

(10) Patent No.: US 7,330,232 B2
(45) Date of Patent: Feb. 12, 2008

(54) VERTICALLY ALIGNED LIQUID CRYSTAL DISPLAY HAVING NEGATIVE COMPENSATION FILM

(75) Inventors: Byoung-kun Jeon, Daejeon (KR); Sergey Belyaev, Daejeon (KR); Jeong-su Yu, Daejeon (KR)

(73) Assignee: LG.Chem, Ltd, Seoul (KR)

( * ) Notice: Subject to any disclaimer, the term of this patent is extended or adjusted under 35 U.S.C. 154(b) by 37 days.

(21) Appl. No.: 10/543,624

(22) PCT Filed: Jan. 27, 2004

(86) PCT No.: PCT/KR2004/000132

§ 371 (c)(1),
(2), (4) Date: Jun. 26, 2006

(87) PCT Pub. No.: WO2004/068225

PCT Pub. Date: Aug. 12, 2004

(65) Prior Publication Data

US 2006/0244884 A1    Nov. 2, 2006

(30) Foreign Application Priority Data

Jan. 28, 2003 (KR) .................. 10-2003-0005467

(51) Int. Cl.
*G02F 1/1335* (2006.01)

(52) U.S. Cl. .................. 349/119; 385/118; 385/117; 385/129

(58) Field of Classification Search ............ 349/178, 349/120, 118, 119, 117, 96, 123, 126, 128, 349/129
See application file for complete search history.

(56) References Cited

U.S. PATENT DOCUMENTS 4,889,412 A    12/1989    Clerc et al. ............ 350/347 E
(Continued)

FOREIGN PATENT DOCUMENTS

EP    0 239 433 A1    2/1987
(Continued)

OTHER PUBLICATIONS

PCT International Search Report, PCT/KR2004/000132, no date.

*Primary Examiner*—Brian M. Healy
(74) *Attorney, Agent, or Firm*—McKenna Long & Aldridge LLP

(57) ABSTRACT

The present invention relates to a vertically aligned LCD (VA-LCD) comprising a negative compensation film including one or more of a first retardation film (+A-plate) satisfying the condition of $n_x > n_y = n_z$ and a first retardation film (−A-plate) satisfying the condition of $n_x < n_y = n_z$, and one or more of a second retardation film (−C-plate) satisfying the condition of $n_x = n_y > n_z$, wherein the first retardation film is arranged such that its optical axis is perpendicular to an optical absorption axis of a neighboring polarizing plate, and a total thickness retardation ($R_{-C} + R_{VA}$) including the thickness retardation of the second retardation film and the thickness retardation of a VA-panel has a negative value. The VA-LCD in accordance with the present invention improves contrast characteristics on a front surface and at a tilt angle and minimizes coloring in a black state according to the tilt angle.

15 Claims, 7 Drawing Sheets

U.S. PATENT DOCUMENTS

| | | |
|---|---|---|
| 6,141,075 A | 10/2000 | Ohmuro et al. .............. 349/130 |
| 6,638,582 B1 | 10/2003 | Uchiyama et al. ........... 428/1.2 |
| 6,642,981 B1 | 11/2003 | Ohmuro et al. .............. 349/120 |
| 7,072,015 B2* | 7/2006 | Maeda ........................ 349/120 |
| 7,151,582 B2* | 12/2006 | Yoshida et al. .............. 349/119 |
| 2004/0135949 A1* | 7/2004 | Maeda ........................ 349/119 |
| 2006/0244884 A1* | 11/2006 | Jeon et al. ................... 349/119 |
| 2007/0177084 A1* | 8/2007 | Ishitani et al. ............... 349/117 |

FOREIGN PATENT DOCUMENTS

| | | |
|---|---|---|
| EP | 0 793 133 A2 | 9/1997 |
| EP | 1 118 885 A1 | 7/2001 |
| JP | 62-210423 | 9/1987 |
| JP | 10-123576 | 5/1998 |
| JP | 2001-042127 | 2/2001 |
| JP | 3330574 | 7/2002 |
| KR | 1997-0062749 | 9/1997 |
| KR | 10-0259111 | 3/2000 |
| TW | 520449 B | 2/2003 |
| TW | 523620 B | 3/2003 |
| WO | WO 95/00879 | 1/1995 |
| WO | WO 01/09649 A1 | 2/2001 |

\* cited by examiner a) b)

VERTICALLY ALIGNED LIQUID CRYSTAL DISPLAY HAVING NEGATIVE COMPENSATION FILM

This application claims priority to Korean Patent Application No. 10-2003-0005467, filed Jan. 28, 2003, which is hereby incorporated by reference.

TECHNICAL FIELD

The present invention relates to a vertically aligned liquid crystal display (hereinafter, referred to as a "VA-LCD") using a compensation film having a negative retardation value so as to improve viewing angle characteristics.

BACKGROUND ART

As well known to those skilled in the art, a −C-plate compensation film and an A-plate compensation film have been used to compensate for a black state of a VA-LCD under the condition that small drive voltage is applied. U.S. Pat. No. 4,889,412 discloses a conventional VA-LCD using the −C-plate compensation film.

However, the conventional VA-LCD using the −C-plate compensation film does not completely compensate for a black state, thus having a disadvantage such as a leakage of light at a viewing angle.

Further, U.S. Pat. No. 6,141,075 discloses a conventional VA-LCD comprising both the −C-plate compensation film and the A-plate compensation film.

The above VA-LCD comprising both the −C-plate compensation film and the A-plate compensation film more completely achieves compensation of a black state under the condition that small drive voltage is applied.

However, the above-described conventional VA-LCDs require improvements of contrast and coloring at a front surface and a tilt angle in order to completely compensate for the black state.

DISCLOSURE OF THE INVENTION

Therefore, the present invention has been made in view of the above problems, and it is an object of the present invention to provide an achromatic VA-LCD comprising a negative compensation film, in which contrast at a front surface and a tilt angle of the VA-LCD filled with liquid crystal having a positive or negative dielectric anisotropy is improved, and coloring at the tilt angle in a black state is minimized, thus improving viewing angle characteristics.

In accordance with the present invention, the above and other objects can be accomplished by the provision of a vertically aligned LCD (VA-LCD) in a multi-domain mode or using a chiral additive, provided with a negative compensation film, in which a vertically aligned panel (VA-panel) is obtained by injecting liquid crystal having a negative dielectric anisotropy ($\Delta\epsilon<0$) or a positive dielectric anisotropy ($\Delta\epsilon>0$) into a gap between upper and lower glass substrates, upper and lower polarizing plates are arranged above the upper and lower surfaces of the VA-panel so that optical absorption axes of the polarizing plates are perpendicular to each other, and a cell gap in the range of 3 μm to 8 μm is maintained, comprising: the negative compensation film including one or more of a first retardation film (+A-plate) satisfying the condition of $n_x>n_y=n_z$, and a first retardation film (−A-plate) satisfying the condition of $n_x<n_y=n_z$, and one or more of a second retardation film (−C-plate) satisfying the condition of $n_x=n_y>n_z$, for forming a liquid crystal cell, the $n_x$ and $n_y$ representing in-plane refractive indexes between the VA-panel and the upper and lower polarizing plates and the $n_z$ representing a thickness refractive index, wherein the first retardation film is arranged such that an optical axis of the first retardation film is perpendicular to an optical absorption axis of the neighboring polarizing plate, and a total thickness retardation ($R_{-C}+R_{VA}$) including the thickness retardation of the second retardation film and the thickness retardation of the VA-panel has a negative value.

Preferably, the negative compensation film may include one of a first retardation film (+A-plate or −A-plate) and one of a second retardation film (−C-plate) in which one of the first retardation film and the second retardation film may be selectively arranged between the VA-panel and the upper polarizing plate, and the other one of the second retardation film is arranged between the VA-panel and the lower polarizing plate, or the first retardation film and the second retardation film are arranged at one area between the VA-panel and the upper polarizing plate, or between the VA-panel and the lower polarizing plate.

Further, preferably, the negative compensation film may include two of a first retardation film (+A-plates or −A-plates) and one of a second retardation film (−C-plate) in which one of the first retardation film and one of the second retardation film may be arranged at one area between the VA-panel and the upper polarizing plate, or between the VA-panel and the lower polarizing plate, and the other one of the first retardation film is arranged at the other area between the VA-panel and the upper polarizing plate, or between the VA-panel and the lower polarizing plate.

Moreover, preferably, the negative compensation film may include two of a first retardation film (+A-plates or −A-plates) and two of a second retardation film (−C-plate) in which one of the first retardation film and one of the second retardation film may be arranged between the VA-panel and the upper polarizing plate, and the other one of the first retardation film and the other one of the second retardation film are arranged between the VA-panel and the lower polarizing plate.

Preferably, a first retardation films (+A-plate and −A-plate) may have a reversed wavelength dispersion in which retardation is increased in proportion to the increase of a wavelength in the range of visible rays. The first retardation film (+A-plate) has an in-plane retardation ($R_A$(550)) at a wavelength of 550 nm, which is in the range of 250 nm to 500 nm, and the first retardation film (−A-plate) has an in-plane retardation ($R_A$(550)) at a wavelength of 550 nm, which is more than −250 nm (i.e. −250 nm $\leq R_A(550) \leq 0$ nm). The ratio ($R_{A,450}/R_{A,550}$) of the in-plane retardations of the first retardation film (A-plate) is in the range of 0.6 to 0.9; and the ratio ($R_{A,550}/R_{A,650}$) of the in-plane retardations of the first retardation film (A-plate) is in the range of 1.1 to 1.5, wherein the $R_{A,450}$, $R_{A,550}$ and $R_{A,650}$ represent in-plane retardations at wavelengths of 450 nM, 550 nm and 650 nm, respectively.

Further, preferably, the total thickness retardation ($R_{-C}+R_{VA}$) including the thickness retardation of a second retardation film and the thickness retardation of the VA-panel may be in the range of −10 nm to −180 nm, being proportional to a wavelength in the range of visible rays.

Moreover, preferably, a second retardation film (−C-plate) may have a thickness retardation (R−C(550)) at a wavelength of 550 nm, which is in the range of −500 nm to −180 nm, and the absolute value (|R−C(550)|) thereof, which is larger than the absolute value (|R_{VA}(550)|) of the thickness retardation of the VA-panel. The ratio ($R_{450}/R_{550}$) of the thickness retardations of the second retardation film (−C-plate) is smaller than that of the VA-panel, and the ratio ($R_{550}/R_{650}$) of the thickness retardations of the second retardation film (−C-plate) is larger than that of the VA-panel, wherein the $R_{450}$, $R_{550}$ and $R_{550}$ represent thickness retardations of the second retardation film (−C-plate) at wavelengths of 450 nm, 550 nm and 650 nm, respectively. The ratio ($R_{-C,450}/R_{-C,550}$) of the thickness retardations of the second retardation film (−C-plate) is in the range of 0.9 to 1.2, and the ratio ($R_{-C,550}/R_{-C,650}$) of the thickness retardations of the second retardation film (−C-plate) is in the range of 0.9 to 1.2, wherein the $R_{-C,450}$, $R_{-C,550}$ and $R_{-C,650}$ represent thickness retardations at wavelengths of 450 nm, 550 nm and 650 nm, respectively.

Preferably, directors of liquid crystalline polymers of the VA-panel, under the condition that no voltage is applied to the VA-panel, may have a pretilt angle in the range of 75° to 90° between the upper and lower glass substrates. The pretilt angle is more preferably in the range of 87° to 90°, and most preferably in the range of 89° to 90°.

A liquid crystalline layer formed on the VA-panel may have a retardation at a wavelength of 550 nm, preferably in the range of 80 nm to 400 nm, and more preferably in the range of 80 nm to 300 nm. A rubbed direction of the liquid crystals injected into the VA-panel may have an angle of 45° with the optical absorption axes of the polarizing plates.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Now, preferred embodiments of the present invention will be described in detail with reference to the annexed drawings.

Figure 1:
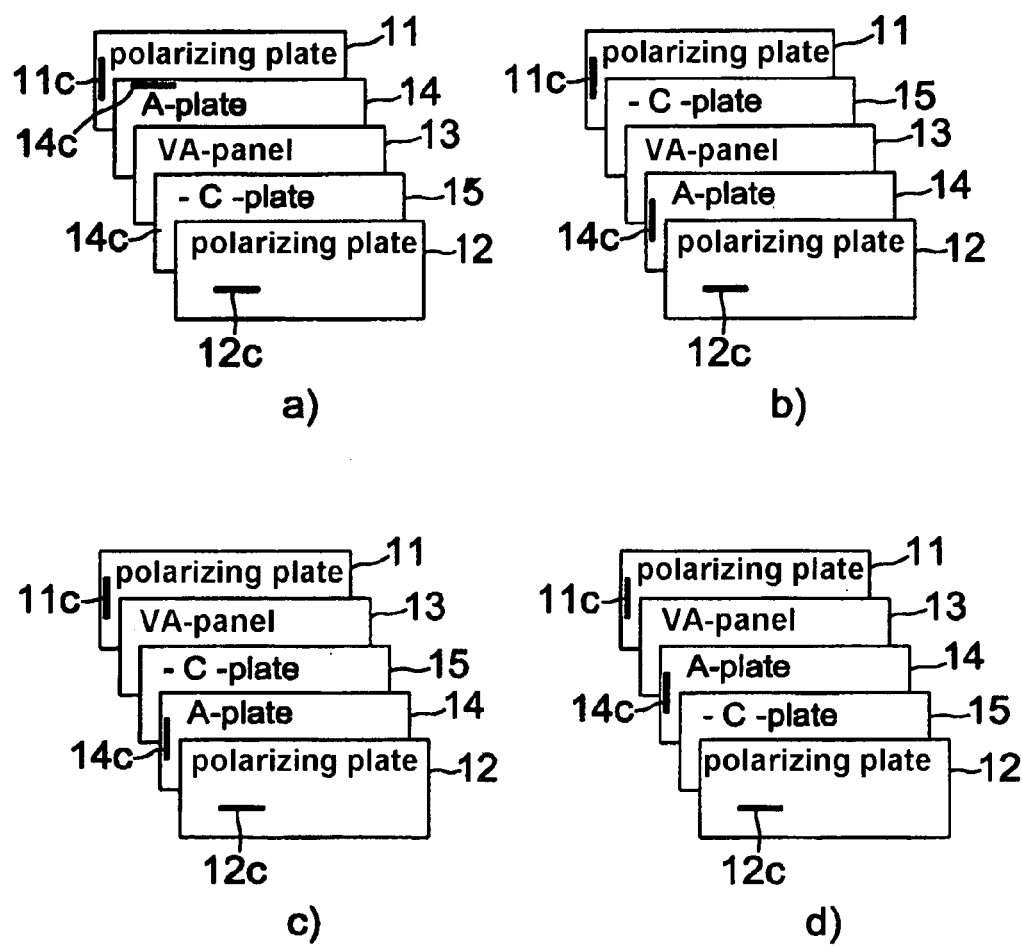
FIGS. 1a to 1d are perspective views of a VA-LCD cell comprising a negative compensation film in accordance with a first embodiment of the present invention.
Figure 2:
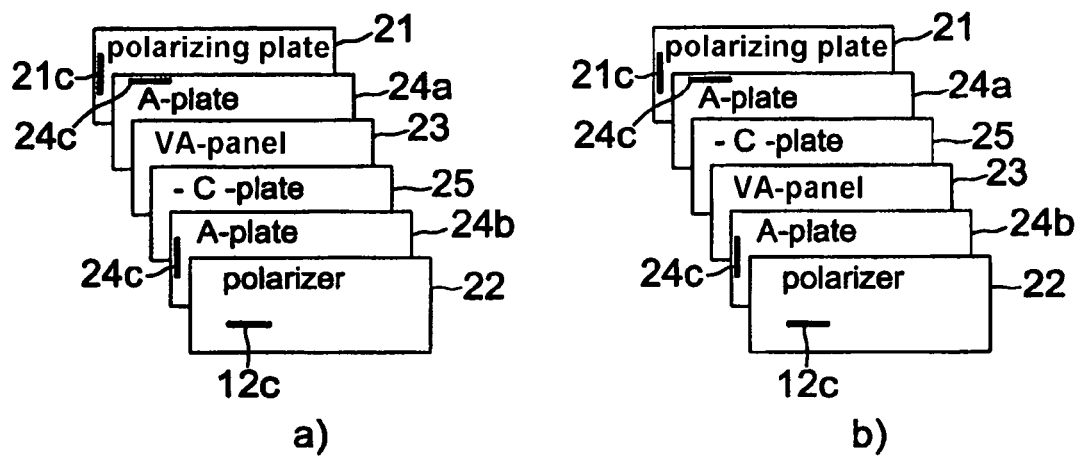
FIGS. 2a and 2b are perspective views of a VA-LCD cell comprising a negative compensation film in accordance with a second embodiment of the present invention.
Figure 3:
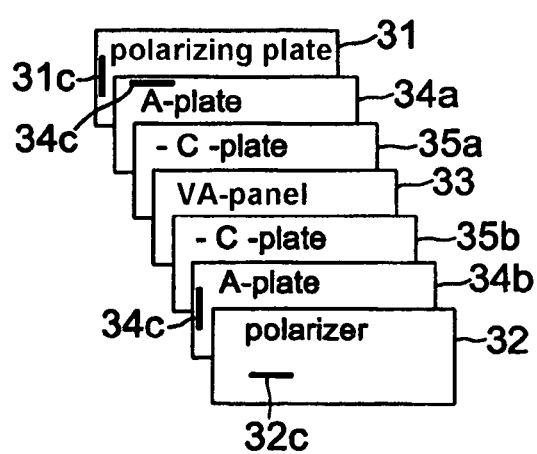
FIG. 3 is a perspective view of a VA-LCD cell comprising a negative compensation film in accordance with a third embodiment of the present invention.

FIGS. 1 to 3 respectively illustrate VA-LCD cells comprising a negative compensation film in accordance with each of Examples of the present invention.

FIGS. 1a to 1d are perspective views of a VA-LCD cell comprising a negative compensation film including one (hereinafter, +A-plate is selected) of a first retardation film (+A-plate or −A-plate) and one of a second retardation film (−C-plate), in accordance with Example 1 of the present invention. FIGS. 2a and 2b are perspective views of a VA-LCD cell comprising a negative compensation film including two of the first retardation film (+A-plates) and one of the second retardation film (−C-plate), in accordance with Example 2 of the present invention. FIG. 3 is a perspective view of a VA-LCD cell comprising a negative compensation film including two of the first retardation film (+A-plates) and two of the second retardation film (−C-plates), in accordance with Example 3 of the present invention.

EXAMPLE 1

As shown in FIGS. 1a to 1d, a VA-LCD in accordance with Example 1 of the present invention comprises a vertically aligned panel (VA-panel) 13 obtained by injecting liquid crystal having a negative dielectric anisotropy (Δε<0) or a positive dielectric anisotropy (Δε>0) into a gap between upper and lower glass substrates, two polarizing plates 11 and 12 arranged above the upper and lower surfaces of the VA-panel 13 so that optical absorption axes 11c and 12c are perpendicular to each other, and a negative compensation film including a first retardation film (+A-plate) 14 and a second retardation film (−C-plate) 15, which are arranged between the VA-panel 13 and the polarizing plates 11 and 12.

In FIG. 1a, a first retardation film (+A-plate) 14 is arranged between the VA-panel 13 and the lower polarizing plate 11, and a second retardation film (−C-plate) 15 is arranged between the VA-panel 13 and the upper polarizing plate 12. Here, the first retardation film (+A-plate) 14 is arranged such that an optical axis 14c of the first retardation film (+A-plate) 14 is perpendicular to the optical absorption axis 11c of the lower polarizing plate 11, thus serving as a compensation film for compensating for retardation.

In FIG. 1b, illustrating a modification of Example 1 shown in FIG. 1a, a first retardation film (+A-plate) 14 is arranged between the VA-panel 13 and the upper polarizing plate 12, and a second retardation film (−C-plate) 15 is arranged between the VA-panel 13 and the lower polarizing plate 11. Here, the first retardation film (+A-plate) 14 is arranged such that the optical axis 14c of the first retardation film (+A-plate) 14 is perpendicular to the optical absorption axis 12c of the upper polarizing plate 12.

In FIG. 1c illustrating another modification of Example 1 shown in FIG. 1a, a first retardation film (+A-plate) 14 and a second retardation film (−C-plate) 15 are arranged between the VA-panel 13 and the upper polarizing plate 12. Here, the first retardation film (+A-plate) 14 is arranged such that the optical axis 14c of the first retardation film (+A-plate) 14 is perpendicular to the optical absorption axis 12c of the upper polarizing plate 12.

In FIG. 1d illustrating yet another modification of Example 1 shown in FIG. 1a, a first retardation film (+A-plate) 14 and a second retardation film (−C-plate) 15 are arranged between the VA-panel 13 and the upper polarizing plate 12. However, the positions of the first retardation film (+A-plate) 14 and the second retardation film (−C-plate) 15 are opposite to the positions of the first retardation film (+A-plate) 14 and the second retardation film (−C-plate) 15 in FIG. 1c. Here, the first retardation film (+A-plate) 14 is arranged such that the optical axis 14c of the first retardation film (+A-plate) 14 is perpendicular to the optical absorption axis 12c of the upper polarizing plate 12.

EXAMPLE 2

As shown in FIGS. 2a and 2b, a VA-LCD in accordance with Example 2 of the present invention comprises two polarizing plates 21 and 22 arranged such that optical absorption axes 21c and 22c are perpendicular to each other, a vertically aligned panel (VA-panel) 23 is interposed between the two polarizing plates 21 and 22, and a negative compensation film including two of the first retardation film (+A-plate) 24a and 24b and one of the second retardation film (−C-plate) 25, which are arranged between the VA-panel 23 and the polarizing plates 21 and 22. One of the first retardation films (+A-plates) 24a and 24b and the second retardation film (−C-plate) 25 are arranged at one area between the VA-panel 23 and the upper polarizing plate 22, or between the VA-panel 23 and the lower polarizing plate 21, and the other one of the first retardation film is arranged at the other area between the VA-panel 23 and the upper polarizing plate 22, or between the VA-panel 23 and the lower polarizing plate 21.

In FIG. 2a, a first retardation film (+A-plate) 24a is arranged between the VA-panel 23 and the lower polarizing plate 21, and a first retardation film (+A-plate) 24b and a second retardation film (−C-plate) 25 are arranged between the VA-panel 23 and the upper polarizing plate 22. Here, the first retardation film (+A-plate) 24a is arranged between the VA-panel 23 and the lower polarizing plate 21 such that an optical axis 24c of the first retardation film (+A-plate) 24a is perpendicular to the optical absorption axis 21c of the lower polarizing plate 21, and the first retardation film (+A-plate) 24b is arranged between the VA-panel 23 and the upper polarizing plate 22 such that an optical axis 24c of the first retardation film (+A-plate) 24b is perpendicular to the optical absorption axis 22c of the upper polarizing plate 22.

In FIG. 2b illustrating a modification of Example 2 shown in FIG. 2a, a first retardation film (+A-plate) 24b is arranged between the VA-panel 23 and the upper polarizing plate 22, and a first retardation film (+A-plate) 24a and a second retardation film (−C-plate) 25 are arranged between the VA-panel 23 and the lower polarizing plate 21. Here, the first retardation film (+A-plate) 24b is arranged between the VA-panel 23 and the upper polarizing plate 22 such that the optical axis 24c of the first retardation film (+A-plate) 24b is perpendicular to the optical absorption axis 22c of the upper polarizing plate 22, and the first retardation film (+A-plate) 24b is arranged between the VA-panel 23 and the lower polarizing plate 21 such that the optical axis 24c of the first retardation film (+A-plate) 24a is perpendicular to the optical absorption axis 21c of the lower polarizing plate 21.

EXAMPLE 3

As shown in FIG. 3, a VA-LCD in accordance with Example 3 of the present invention comprises two polarizing plates 31 and 32 arranged such that optical absorption axes 31c and 32c are perpendicular to each other, a vertically aligned panel (VA-panel) 33 is interposed between the two polarizing plates 31 and 32, and a negative compensation film including two of a first retardation film (+A-plates) 34a and 34b and two of a second retardation film (−C-plates) 35a and 35b, which are arranged between the VA-panel 33 and the polarizing plates 31 and 32. One of the first retardation films (+A-plates) 34a and 34b and one of the second retardation films (−C-plates) 35a and 35b are arranged at one area between the VA-panel 33 and the upper polarizing plate 32 and between the VA-panel 33 and the lower polarizing plate 31, and the other one of the first retardation films (+A-plates) 34a and 34b and the other one of the second retardation films (−C-plates) 35a and 35b are arranged at the other area between the VA-panel 33 and the upper polarizing plate 32 and between the VA-panel 33 and the lower polarizing plate 31.

In FIG. 3, a first retardation film (+A-plate) 34a and a second retardation film (−C-plate) 35a are arranged between the VA-panel 33 and the lower polarizing plate 31, and a first retardation film (+A-plate) 34b and a second retardation film (−C-plate) 35b are arranged between the VA-panel 33 and the upper polarizing plate 32. Here, the first retardation film (+A-plate) 34a is arranged between the VA-panel 33 and the lower polarizing plate 31 such that an optical axis 34c of the first retardation film (+A-plate) 34a is perpendicular to the optical absorption axis 31c of the lower polarizing plate 31, and the first retardation film (+A-plate) 34b is arranged between the VA-panel 33 and the upper polarizing plate 32 such that an optical axis 34c of the first retardation film (+A-plate) 34b is perpendicular to the optical absorption axis 32c of the upper polarizing plate 32.

The above-described VA-LCD in accordance with each of Example 1 to 3 of the present invention is a multi-domain vertically aligned LCD (MVA-LCD) or a VA-LCD using a chiral additive, which maintains a cell gap in the range of 3 μm to 8 μm and is obtained by forming the VA-panel by injecting liquid crystal having a negative dielectric anisotropy ($\Delta\epsilon<0$) or a positive dielectric anisotropy ($\Delta\epsilon>0$) into a gap between upper and lower glass substrates and arranging two polarizing plates above the upper and lower surfaces of the VA-panel so that optical absorption axes of the polarizing plates are perpendicular to each other. Here, since the negative compensation film including at least one of a first retardation film (+A-plate) and at least one of a second retardation film (−C-plate) is arranged between the VA-panel and the upper and lower polarizing plates, the VA-LCD has a characteristic such that a total thickness retardation ($R_{-C}+R_{VA}$) including a retardation of the second retardation film (−C-plate) and a retardation of the VA-panel has a negative value.

Two types (+A-plate and −A-plate) of a first retardation films, which are used as the compensation film of the respective embodiments of the present invention, have a reversed wavelength dispersion in which retardation is increased in proportion to the increase of a wavelength in the range of visible rays. One type (+A-plate) of the first retardation films has an in-plane retardation in the range of 250 nm to 500 nm at a wavelength of 550 nm (i.e., 250 nm$\leq R_A(550) \leq$500 nm), and the other type (−A-plate) of the first retardation films has an in-plane retardation of more than −250 nm at a wavelength of 550 nm (i.e., −250 nm≦$R_A(550)$≦0 nm).

The total thickness retardation ($R_{-C}+R_{VA}$) including the retardation of a second retardation film (−C-plate) and the retardation of the VA-panel has a value in the range of −10 nm to −180 nm, being proportional to a wavelength in the range of visible rays. Particularly, the second retardation film (−C-plate) has a thickness retardation in the range of −500 mm to −180 nm at a wavelength of 550 nm (i.e., −500 nm≦R-c(550)≦−180 nm). The absolute value (|$R_{-C}(550)$|) of the thickness retardation of the second retardation film (−C-plate) is larger than the absolute value (|$R_{VA}(550)$|) of the thickness retardation of the VA-panel. The ratio ($R_{450}/R_{550}$) of the thickness retardation of the second retardation film (−C-plate) at a wavelength of 450 nm to the thickness retardation of the second retardation film (C-plate) at a wavelength of 550 nm is smaller than the ratio of the thickness retardation of the VA-panel at a wavelength of 450 nm to the thickness retardation of the VA-panel at a wavelength of 550 nm, and the ratio ($R_{550}/R_{650}$) of the thickness retardation of the second retardation film (−C-plate) at a wavelength of 550 nm to the thickness retardation of the second retardation film (−C-plate) at a wavelength of 650 nm is larger than the ratio of the thickness retardation of the VA-panel at a wavelength of 550 nm to the thickness retardation of the VA-panel at a wavelength of 650 nm.

Under the condition that no voltage is applied to the VA-panel in accordance with each of Examples of the present invention, directors of liquid crystalline polymers of the VA-panel have a pretilt angle in the range of 75° to 90° between the upper and lower substrates, preferably in the range of 87° to 90°, and more preferably in the range of 89° to 90°.

Further, a liquid crystalline layer formed on the VA-panel in accordance with each of the embodiments of the present invention has a retardation in the range of 80 nm to 400 nm at a wavelength of 550 nm, and preferably in the range of 80 nm to 300 nm. A rubbed direction of liquid crystals injected into the VA-panel has an angle of 45° with the optical absorption axis of the polarizing plate.

The polarizing plate applied to each of Examples of the present invention includes a TAC (Triacetate Cellulose) protective film having a designated thickness retardation, or one of other protective films having no designated thickness retardation.

Figure 4:
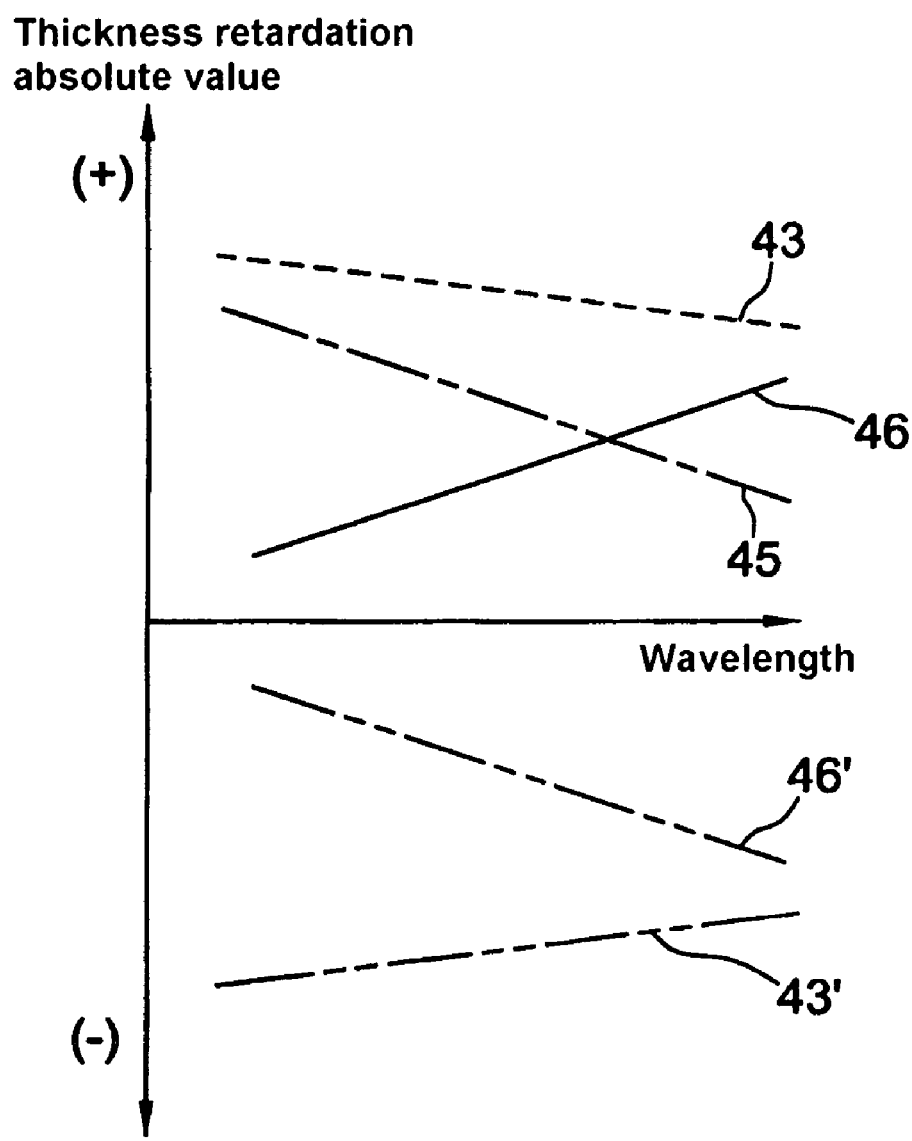
FIG. 4 is a graph showing the results of simulation for wavelength dependability of a thickness retardation of the VA-LCD cell, a thickness retardation of a C-plate, its absolute value, and a total thickness retardation in the VA-LCD cell comprising the negative compensation film of the present invention.

FIG. 4 is a graph showing the results of simulation for wavelength dependability of a thickness retardation ($R_{VA}>0$) 45 of the VA-panel, a thickness retardation ($R_{-C}<0$) 43' of a second retardation film (−C-plate), its absolute value 43, a total thickness retardation ($R_{VA}+R_{-C}<0$) 46', and its absolute value 46. Here, there is applied an achromatic negative compensation film in which the total thickness retardation ($R_{VA}+R_{-C}<0$) 46' of the retardations of the VA-panel and a second retardation film (−C-plate) has a negative value.

The thickness retardation ($R_{-C,550}$) of a second retardation film (−C-plate), which is required to compensate for the VA-LCD so as to solve a leakage of light caused by the VA-LCD, is obtained by the below equation.

$$R_{VA,550}+R_{-C,550}=-20 \text{ nm}\sim-150 \text{ nm (mean value: } -85 \text{ nm)}$$

$$R_{VA,550}=(d\times\Delta n_{550})_{VA}$$

Here, $R_{VA,550}$ represents a thickness retardation of the VA-panel at a wavelength of 550 nm, and $R_{-C,550}$ represents a thickness retardation of the second retardation film (−C-plate) at a wavelength of 550 nm. A wavelength dispersion required by the second retardation film (−C-plate) is calculated by the below equation.

$$(\Delta n_\lambda/\Delta n_{550})_{VA}\times R_{VA,550}+(\Delta n_\lambda/\Delta n_{550})_{-C}\times R_{-C,550}=-85 \text{ nm}$$

Here, $(\Delta n_\lambda/\Delta n_{550})_{VA}$ represents a wavelength dispersion of the thickness retardation of the VA-panel, and $(\Delta n_\lambda/\Delta n_{550})_{-C}$ represents a wavelength dispersion of the thickness retardation of a second retardation film (−C-plate).

A first retardation film is either a retardation film (+A-plate), in which one of an in-plane refractive index ($n_x$) in an X direction and an in-plane refractive index ($n_y$) in an Y direction is the same as a thickness refractive index ($n_z$) and the other one of the in-plane refractive indexes ($n_x$ and $n_y$) is larger than the thickness refractive index ($n_z$), i.e., the condition of $n_x>n_y=n_z$, or a retardation film (−A-plate), in which one of an in-plane refractive index ($n_x$) in an X direction and an in-plane refractive index ($n_y$) in an Y direction is the same as a thickness refractive index ($n_z$) and the other one of the in-plane refractive indexes ($n_x$ and $n_y$) is smaller than the thickness refractive index ($n_z$), i.e., the condition of $n_x<n_y=n_z$. The negative compensation film of the VA-LCD in accordance with the present invention includes one of the first retardation film (+A-plate) satisfying the condition of $n_x>n_y=n_z$, and the first retardation film (−A-plate) satisfying the condition of $n_x<n_y=n_z$. Here, one of the retardation films (+A-plate and −A-plate) included by the negative compensation film is arranged such that its optical axis is perpendicular to an optical absorption axis of a neighboring polarizing plate, and has a reversed wavelength dispersion in which retardation is increased in proportion to the increase of a wavelength. Preferably, the absolute value of the retardation of the first retardation film (+A-plate) does not exceed 500 nm, and the absolute value of the retardation of the first retardation film (−A-plate) does not exceed −250 nm (i.e., −250 nm≦$R_A(550)$≦0 nm).

A second retardation film (−C-plate) is designed such that the absolute value of the retardation of the second retardation film (−C-plate) is larger than the absolute value of the retardation of the VA-panel, i.e., |$R_{-C}$|>|$R_{VA}$|, and the total thickness retardation ($R_{-C}+R_{VA}$) is in the range of −10 nm to −180 nm. Preferably, the absolute value of the total thickness retardation ($R_{-C}+R_{VA}$) is increased in proportion to the increase of a wavelength.

Hereinafter, optical characteristics of a first and a second retardation films are described.

A first retardation film (+A-plate) has a ratio ($R_{450}/R_{550}$) of the retardations at wavelengths of 450 nm and 550 nm in the range of 0.6 to 0.9, and a ratio ($R_{550}/R_{650}$) of the retardations at wavelength of 550 nm and 650 nm in the range of 1.1 to 1.5. Here, $R_{450}$ represents a retardation of the first retardation film (+A-plate) at a wavelength of 450 nm, $R_{550}$ represents a retardation of the first retardation film (+A-plate) at a wavelength of 550 nm, and $R_{650}$ represents a retardation of the first retardation film (+A-plate) at a wavelength of 650 nm.

A second retardation film (C-plate) has a retardation ($R_{-C}$) in the range of −500 nm to −180 nm at a wavelength of 550 nm. The second retardation film (C-plate) has a ratio ($R_{450}/R_{550}$) of the retardations at wavelengths of 450 nm and 550 nm in the range of 0.95 to 1.2, and a ratio ($R_{550}/R_{650}$) of the retardations at wavelength of 550 nm and 650 nm in the range of 0.95 to 1.2. Here, $R_{450}$ represents a retardation of the second retardation film (C-plate) at a wavelength of 450 nm, $R_{550}$ represents a retardation of the second retardation film (C-plate) at a wavelength of 550 nm, and $R_{650}$ represents a retardation of the second retardation film (C-plate) at a wavelength of 650 nm.

Figure 5:
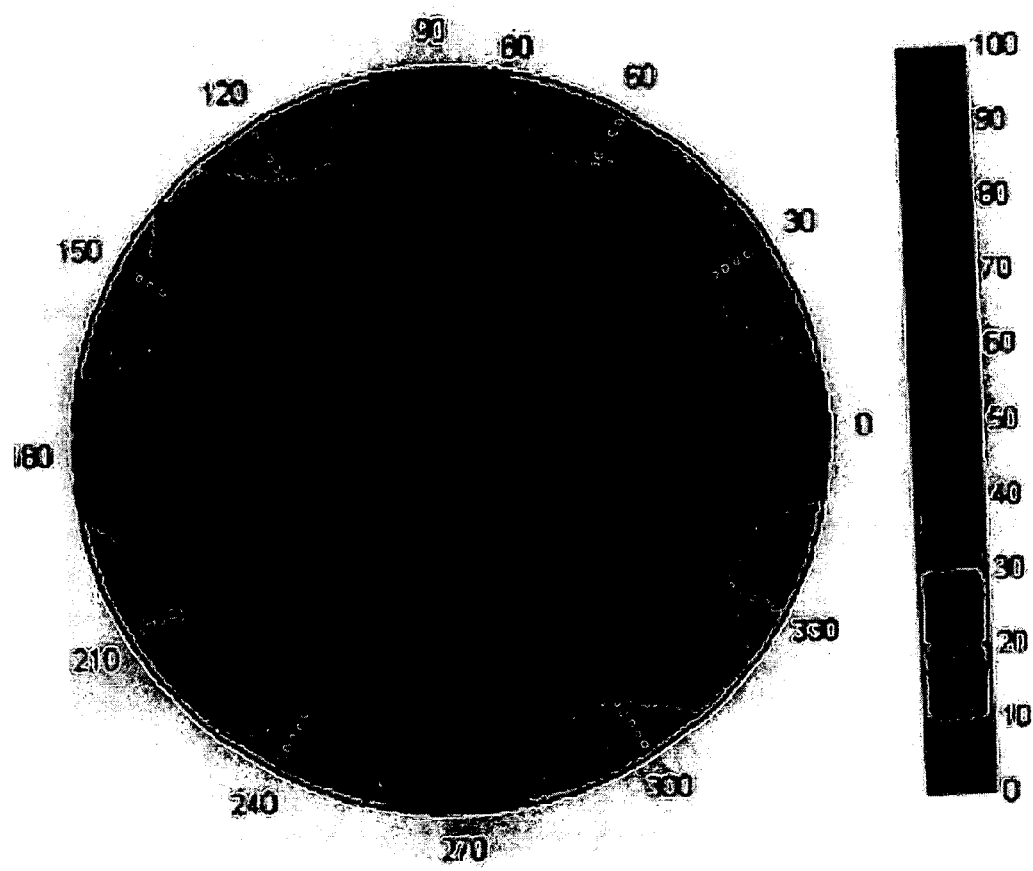
FIG. 5 is a diagram showing the result of simulation for a contrast ratio of the VA-LCD cell in accordance with the first embodiment of the present invention at a tilt angle in the range of 0° to 80° at all azimuth angles, in case that a white ray is applied.
Figure 6:
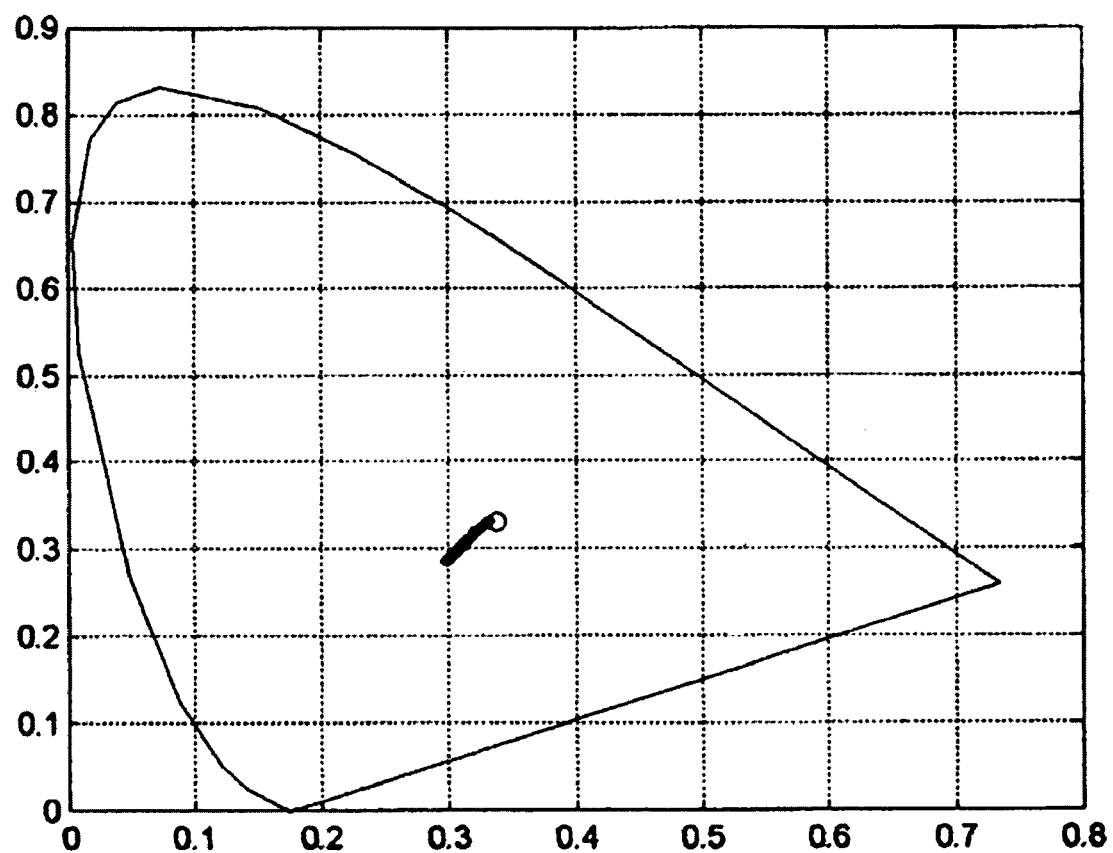
FIG. 6 is a diagram showing the result of simulation for coloring of the VA-LCD cell in accordance with the first embodiment of the present invention in a black state at a tilt angle in the range of 0° to 80°, which is varied by an interval of 2°, at an azimuth angle of 45°, in case that a white ray is applied.
Figure 7:
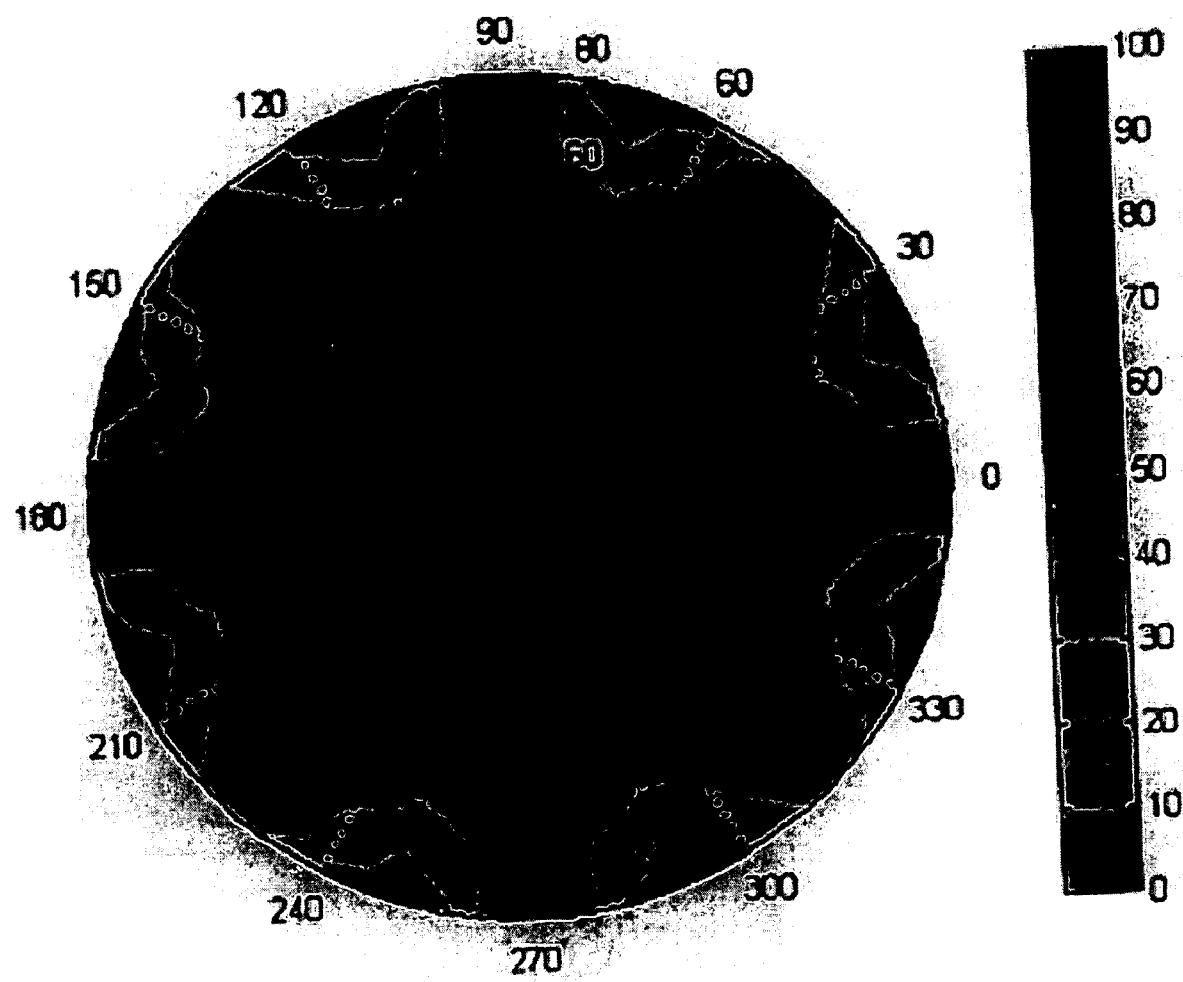
FIG. 7 is a diagram showing the results of simulation for a contrast ratio of the VA-LCD cells in accordance with the second and third embodiments of the present invention at a tilt angle in the range of 0° to 80° at all azimuth angles, in case that a white ray is applied.
Figure 8:
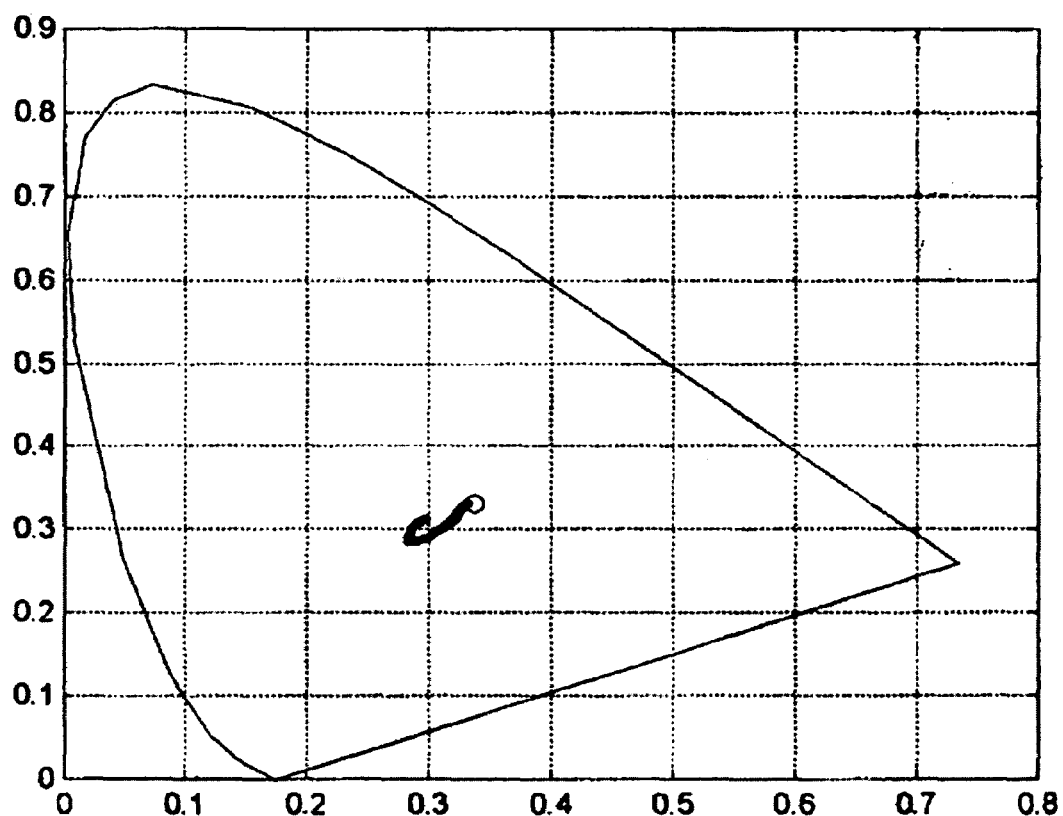
FIG. 8 is a diagram showing the results of simulation for coloring of the VA-LCD cells in accordance with the second and third embodiments of the present invention in a black state at a tilt angle in the range of 0° to 80°, which is varied by an interval of 2°, at an azimuth angle of 45°, in case that a white ray is applied.

FIGS. 5 to 8 show the results of simulation obtained in respective Examples of the present invention. FIGS. 5 and 7 show the results of simulation for a contrast ratio, using a color coordinate, obtained by the VA-LCD of the respective examples of the present invention at a tilt angle in the range of 0° to 80° at all azimuth angles, in case that a white ray is applied. FIGS. 6 and 8 show the results of simulation for coloring in a black state, using a color coordinate, obtained by the VA-LCD of the respective Examples of the present invention at a tilt angle in the range of 0° to 80°, which is varied by an interval of 2°, at an azimuth angle of 45°, in case that a white ray is applied.

Hereinafter, experimental examples for testing contrast characteristics of samples selected from the above Examples of the present invention will be described. Improvements of the contrast characteristics in the respective Examples will be more easily understood by the below experimental examples. The below experimental examples will be disclosed for illustrative purposes, but do not limit the subject matter of the present invention.

EXPERIMENTAL EXAMPLE 1

A sample employed by Experimental Example 1 was the VA-LCD using a compensation film including one of a first retardation film (+A-plate) and one of a second retardation film (−C-plate) in accordance with Example 1 of the present invention, as shown in FIG. 1a. The VA-LCD comprises the VA-panel 13 having a cell gap of 3 μm. Here, a pretilt angle of directors of liquid crystalline polymers is 89°, a dielectric anisotropy (Δε) is −4.9, a refractive anisotropy (Δn) is 0.099, and a wavelength dispersion ($\Delta n_{400}/\Delta n_{550}$) is 1.05.

Accordingly, a thickness retardation ($R_{VA,550}$) of the VA-panel 13 at a wavelength of 550 nm is 297 nm.

The above second retardation film (−C-plate) of the compensation film employed a polymer film having a thickness retardation ($R_{-C,550}$) of −354 nm and a wavelength dispersion ($R_{-C,450}/R_{-C,550}$) of 1.01.

The above first retardation film (+A-plate) of the compensation film employed a polymer film made of TAC having an in-plane retardation ($R_{A,550}$) of 395 mm and a wavelength dispersion ($R_{A,450}/R_{A,550}$) of 0.82.

Each of the two polarizing plates 11 and 12 employed a protective film made of COP (cycloolefin) instead of TAC (Triacetate cellulose).

FIG. 5 shows the result of simulation for a contrast ratio of the above VA-LCD at a tilt angle in the range of 0° to 80° at all azimuth angles, in case that a white ray is applied. FIG. 6 shows the result of simulation for coloring of the above. VA-LCD in a black state at a tilt angle in the range of 0° to 80°, which is varied by an interval of 2°, at an azimuth angle of 45°, in case that a white ray is applied.

Table 1 comparatively shows contrasts of the sample (hereinafter, referred to as a "first sample") employed by Experimental Example 1 and a sample (hereinafter, referred to as a "second sample") serving as a comparative example. Here, in the first sample, the retardation ($R_{VA}$) of the VA-panel, the retardation ($R_{-C}$) of a second retardation film, the total retardation ($R_{TOTAL}$) and the retardation ($R_A$) were 297, −354, −57 and 395, respectively. On the other hand, in the second sample, the retardation ($R_{VA}$) of the VA-panel, the retardation ($R_{-C}$) of the second retardation film, the total retardation ($R_{TOTAL}$) and the retardation ($R_A$) were 297, −500, +203 and 460, respectively. The minimum contrasts of the first and second samples at a tilt angle of 70° were 350 and 5, respectively.

TABLE 1

| | $R_{VA}$ | $R_{-C}$ | $R_{TOTAL}$ | $R_A$ | Minimum contrast (at a tilt angle of 70°) |
|---|---|---|---|---|---|
| First sample (Experimental Example) | 297 | −354 | −57 | 395 | 350 |
| Second sample (Comparative Example) | 297 | −500 | +203 | 460 | 5 |

In Table 1, the minimum contrasts of the first and second samples at a tilt angle of 70° were 350 and 5. Since the tilt angle of 70° has the minimum contrast, other tilt angles rather than the tilt angle of 70° have contrasts higher than the minimum contrast. Accordingly, the contrasts at other tilt angles rather than the tilt angle of 70° are higher than the minimum contrast.

FIRST MODIFIED EXAMPLE OF EXPERIMENTAL EXAMPLE 1

A sample employed by the first modified example of Experimental Example 1 was the VA-LCD using a compensation film including one of a first retardation film (+A-plate) and one of a second retardation film (−C-plate).

The VA-LCD of FIG. 1a comprises the VA-panel 13 having a cell gap of 3 μm. Here, a pretilt angle of directors of liquid crystalline polymers is 89°, a dielectric anisotropy (Δε) is −4.9, a refractive anisotropy (Δn) is 0.099, and a wavelength dispersion ($\Delta n_{400}/\Delta n_{550}$) is 1.05. Accordingly, the thickness retardation ($R_{VA,550}$) of the VA-panel 13 at a wavelength of 550 nm is 297 nm.

The above second retardation film (−C-plate) of the compensation film employed a polymer film made of TAC having a thickness retardation ($R_{-C,550}$) of −316 mm and a wavelength dispersion ($R_{-C,450}/R_{-C,550}$) of 1.01. The above first retardation film (+A-plate) of the compensation film employed a polymer film made of TAC having an in-plane retardation ($R_{A,550}$) of 316 nm and a wavelength dispersion ($R_{A,450}/R_{A,550}$) Of 0.79.

FIG. 5 shows the result of simulation for contrast ratio of the above VA-LCD at a tilt angle in the range of 0° to 80° at all azimuth angles, in case that a white ray is applied. FIG. 6 shows the result of simulation for coloring of the above VA-LCD in a black state at a tilt angle in the range of 0° to 80°, which is varied by an interval of 20, at an azimuth angle of 45°, in case that a white ray is applied.

SECOND MODIFIED EXAMPLE OF EXPERIMENTAL EXAMPLE 1

A sample employed by the second modified example of Experimental Example 1 was the VA-LCD using a compensation film including one of a first retardation film (−A-plate) and one of a second retardation film (−C-plate).

The VA-LCD of FIG. 1a comprises the VA-panel 13 having a cell gap of 3 μm. Here, a pretilt angle of directors of liquid crystalline polymers is 89°, a dielectric anisotropy (Δε) is −4.9, a refractive anisotropy (Δn) is 0.099, and a wavelength dispersion ($\Delta n_{400}/\Delta n_{550}$) is 1.05. Accordingly, the thickness retardation ($R_{VA,550}$) of the VA-panel 13 at a wavelength of 550 nm is 297 nm.

The above second retardation film (−C-plate) of the compensation film employed a polymer film made of TAC having a thickness retardation ($R_{-C,550}$) of −352 nm and a wavelength dispersion ($R_{-C,450}/R_{-C,550}$) of 1.01. The above first retardation film (−A-plate) of the compensation film employed a polymer film made of polystyrene having an in-plane retardation ($R_{A,550}$) of −150 nm and a wavelength dispersion ($R_{A,450}/R_{A,550}$) of 0.82.

Each of the two polarizing plates 11 and 12 employed a protective film made of COP (cycloolefin) instead of TAC (Triacetate cellulose).

FIG. 5 shows the result of simulation for contrast ratio of the above VA-LCD at a tilt angle in the range of 0° to 80° at all azimuth angles, in case that a white ray is applied. FIG. 6 shows the result of simulation for coloring of the above VA-LCD in a black state at a tilt angle in the range of 0° to 80°, which is varied by an interval of 2°, at an azimuth angle of 45°, in case that a white ray is applied.

THIRD MODIFIED EXAMPLE OF EXPERIMENTAL EXAMPLE 1

A sample employed by the third modified example of Experimental Example 1 was the VA-LCD using a compensation film including one of a first retardation film (−A-plate) and one of a second retardation film (−C-plate).

The VA-LCD of FIG. 1b comprises the VA-panel 13 having a cell gap of 3 μm. Here, a pretilt angle of directors of liquid crystalline polymers is 89°, a dielectric anisotropy (Δε) is −4.9, a refractive anisotropy (Δn) is 0.099, and a wavelength dispersion ($\Delta n_{400}/\Delta n_{550}$) is 1.05. Accordingly, the thickness retardation ($R_{VA,550}$) of the VA-panel 13 at a wavelength of 550 nm is 297 nm.

The above second retardation film (−C-plate) of the compensation film employed a polymer film made of TAC having a thickness retardation ($R_{-C,550}$) of −390 nm and a wavelength dispersion ($R_{-C,450}/R_{-C,550}$) of 1.01. The above first retardation film (−A-plate) of the compensation film employed a polymer film made of polystyrene having an in-plane retardation ($R_{A,550}$) of −206 nm and a wavelength dispersion ($R_{A,450}/R_{A,550}$) of 0.92.

Each of the two polarizing plates 11 and 12 employed a protective film made of COP (cycloolefin) instead of TAC (Triacetate cellulose).

FIG. 5 shows the result of simulation for contrast ratio of the above VA-LCD at a tilt angle in the range of 0° to 80° at all azimuth angles, in case that a white ray is applied. FIG. 6 shows the result of simulation for coloring of the above VA-LCD in a black state at a tilt angle in the range of 0° to 80°, which is varied by an interval of 2°, at an azimuth angle of 45°, in case that a white ray is applied.

EXPERIMENTAL EXAMPLE 2

A sample employed by the second experimental example was the VA-LCD using a compensation film including two of a first retardation films (A-plates) and one of a second retardation films (−C-plate). The VA-LCD of FIG. 2a comprises the VA-panel 23 having a cell gap of 3 μm. Here, a pretilt angle of directors of liquid crystalline polymers is 89°, a dielectric anisotropy (Δε) is −4.9, a refractive anisotropy (Δn) is 0.099, and a wavelength dispersion ($\Delta n_{400}/\Delta n_{550}$) is 1.05. Accordingly, the thickness retardation ($R_{VA,550}$) of the VA-panel 23 at a wavelength of 550 nm is 297 nm.

The above second retardation film (−C-plate) of the compensation film employed a polymer film having a thickness retardation ($R_{-C,550}$) of −425 nm and a wavelength dispersion ($R_{-C,450}/R_{-C,550}$) of 1.02. Each of the above first retardation films (A-plates) of the compensation film employed a polymer film having an in-plane retardation ($R_{A,550}$) of 436 nm and a wavelength dispersion ($R_{A,450}/R_{A,550}$) of 0.82.

Each of the two polarizing plates 21 and 22 employed a protective film made of COP (cycloolefin) instead of TAC (Triacetate cellulose).

FIG. 7 shows the result of simulation for contrast ratio of the above VA-LCD at a tilt angle in the range of 0° to 80° at all azimuth angles, in case that a white ray is applied. FIG. 8 shows the result of simulation for coloring of the above VA-LCD in a black state at a tilt angle in the range of 0° to 80°, which is varied by an interval of 2°, at an azimuth angle of 45°, in case that a white ray is applied.

FIRST MODIFIED EXAMPLE OF EXPERIMENTAL EXAMPLE 2

A sample employed by the first modified example of Experimental Example 2 was the VA-LCD using a compensation film including two of a first retardation film (−A-plates) and one of a second retardation film (−C-plate).

The VA-LCD of FIG. 2b comprises the VA-panel 23 having a cell gap of 3 μm. Here, a pretilt angle of directors of liquid crystalline polymers is 89°, a dielectric anisotropy (Δε) is −4.9, a refractive anisotropy (Δn) is 0.099, and a wavelength dispersion ($\Delta n_{400}/\Delta n_{550}$) is 1.05. Accordingly, the thickness retardation ($R_{VA,550}$) of the VA-panel 23 at a wavelength of 550 nm is 297 nm.

The above second retardation film (−C-plate) of the compensation film employed a polymer film made of TAC having a thickness retardation ($R_{-C,550}$) of −390 nm and a wavelength dispersion ($R_{-C,450}/R_{-C,550}$) of 1.01. Each of the above first retardation films (−A-plates) of the compensation film employed a polymer film made of polystyrene having an in-plane retardation ($R_{A,550}$) of −80 nm and a wavelength dispersion ($R_{A,450}/R_{A,550}$) of 0.82.

Each of the two polarizing plates 21 and 22 employed a protective film made of COP (cycloolefin) instead of TAC (Triacetate cellulose).

FIG. 7 shows the result of simulation for contrast ratio of the above VA-LCD at a tilt angle in the range of 0° to 800 at all azimuth angles, in case that a white ray is applied. FIG. 8 shows the result of simulation for coloring of the above VA-LCD in a black state at a tilt angle in the range of 0° to 80°, which is varied by an interval of 2°, at an azimuth angle of 45°, in case that a white ray is applied.

EXPERIMENTAL EXAMPLE 3

A sample employed by Experimental Example 3 was the VA-LCD using a compensation film including two of a first retardation film (+A-plates) and two of a second retardation film (−C-plates). The VA-LCD of FIG. 3 comprises the VA-panel 33 having a cell gap of 3 μm. Here, a pretilt angle of directors of liquid crystalline polymers is 89°, a dielectric anisotropy (Δε) is −4.9, a refractive anisotropy (Δn) is 0.099, and a wavelength dispersion ($\Delta n_{400}/\Delta n_{550}$) is 1.05. Accordingly, the thickness retardation ($R_{VA,550}$) of the VA-panel 33 at a wavelength of 550 nm is 297 nm.

Each of the above second retardation films (−C-plates) of the compensation film employed a polymer film having a thickness retardation ($R_{-C,550}$) of −212 nm and a wavelength dispersion ($R_{-C,450}/R_{-C,550}$) of 1.01. Each of the above first retardation films (+A-plates) of the compensation film employed a polymer film having an in-plane retardation ($R_{A,550}$) of 436 nm and a wavelength dispersion ($R_{A,450}/R_{A,550}$) of 0.82.

Each of the two polarizing plates 31 and 32 employed a protective film made of COP (cycloolefin) instead of TAC (Triacetate cellulose).

FIG. 7 shows the result of simulation for contrast ratio of the above VA-LCD at a tilt angle in the range of 0° to 80° at all azimuth angles, in case that a white ray is applied. FIG. 8 shows the result of simulation for coloring of the above VA-LCD in a black state at a tilt angle in the range of 0° to 80°, which is varied by an interval of 2°, at an azimuth angle of 45°, in case that a white ray is applied.

FIRST MODIFIED EXAMPLE OF EXPERIMENTAL EXAMPLE 3

A sample employed by the first modified example of Experimental Example 3 was the VA-LCD using a compensation film including two of a first retardation film (−A-plates) and two of a second retardation film (−C-plates). The VA-LCD of FIG. 3 comprises the VA-panel 33 having a cell gap of 3 μm. Here, a pretilt angle of directors of liquid crystalline polymers is 89°, a dielectric anisotropy (Δε) is −4.9, a refractive anisotropy (Δn) is 0.099, and a wavelength dispersion ($\Delta n_{400}/\Delta n_{550}$) is 1.05. Accordingly, the thickness retardation ($R_{VA,550}$) of the VA-panel 33 at a wavelength of 550 nm is 297 nm.

Each of the above second retardation films (−C-plates) of the compensation film employed a polymer film made of TAC (Triacetate cellulose) having a thickness retardation ($R_{-C,550}$) of −195 nm and a wavelength dispersion ($R_{-C,450}/R_{-C,550}$) of 1.01. Each of the above first retardation films (−A-plates) of the compensation film employed a polymer film made of polystyrene having an in-plane retardation ($R_{A,550}$) of −80 nm and a wavelength dispersion ($R_{A,450}/R_{A,550}$) of 0.82.

Each of the two polarizing plates 31 and 32 employed a protective film made of COP (cycloolefin) instead of TAC (Triacetate cellulose).

FIG. 7 shows the result of simulation for contrast ratio of the above VA-LCD at a tilt angle in the range of 0° to 80° at all azimuth angles, in case that a white ray is applied. FIG. 8 shows the result of simulation for coloring of the above VA-LCD in a black state at a tilt angle in the range of 0° to 80°, which is varied by an interval of 2°, at an azimuth angle of 45°, in case that a white ray is applied.

INDUSTRIAL APPLICABILITY

As apparent from the above description, the present invention provides a VA-LCD comprising a negative compensation film including at least one of a first retardation film (A-plate) and at least one of a second retardation film (−C-plate), which compensates for a dark state at a tilt angle of the VA-LCD and minimizes coloring in dark, white and RGB states, thus improving viewing angle characteristics.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A vertically aligned LCD (VA-LCD) in a multi-domain mode or using a chiral additive, provided with a negative compensation film, in which a vertically aligned panel (VA-panel) is obtained by injecting liquid crystal having a negative dielectric anisotropy (Δε<0) or a positive dielectric anisotropy (Δε>0) into a gap between upper and lower glass substrates, upper and lower polarizing plates are arranged above the upper and lower surfaces of the VA-panel so that optical absorption axes of the polarizing plates are perpendicular to each other, and a cell gap in the range of 3 μm to 8 μm is maintained, comprising:

the negative compensation film including one or more of a first retardation film (+A-plate) satisfying the condition of $n_x > n_y = n_z$, and a first retardation film (−A-plate) satisfying the condition of $n_x < n_y = n_z$, and one or more of a second retardation film (−C-plate) satisfying the condition of $n_x = n_y > n_z$, for forming a liquid crystal cell, wherein said $n_x$ and $n_y$ represent in-plane refractive indexes between the VA-panel and the upper and lower polarizing plates, and said $n_z$ represents a thickness refractive index, wherein said first retardation film is arranged such that an optical axis of said first retardation film is perpendicular to an optical absorption axis of the neighboring polarizing plate, and a total thickness retardation ($R_{-C} + R_{VA}$) including the thickness retardation of said second retardation film and the thickness retardation of the VA-panel has a negative value.

2. The VA-LCD according to claim 1, wherein
said negative compensation film includes one of said first retardation film (+A-plate and −A-plate) and one of said second retardation film (−C-plate) in which
one of said first retardation film and said second retardation film is selectively arranged between the VA-panel and the upper polarizing plate, and the other one of said second retardation film is arranged between the VA-panel and the lower polarizing plate, or
said first retardation film and said second retardation film are arranged at one area between the VA-panel and the upper polarizing plate, or between the VA-panel and the lower polarizing plate.

3. The VA-LCD according to claim 1, wherein
said negative compensation film includes two of said first retardation film (+A-plates or −A-plates) and one of said second retardation film (−C-plate) in which
one of said first retardation film, and one of said second retardation film are arranged at one area between the VA-panel and the upper polarizing plate, or between the VA-panel and the lower polarizing plate, and the other one of said first retardation films is arranged at the other area between the VA-panel and the upper polarizing plate, or between the VA-panel and the lower polarizing plate.

4. The VA-LCD according to claim 1, wherein
said negative compensation film includes two of said first retardation film (+A-plates or −A-plates) and two of said second retardation film (−C-plate) in which
one of said first retardation film and one of said second retardation film are arranged between the VA-panel and the upper polarizing plate, and the other one of said first retardation film and the other one of said second retardation film are arranged between the VA-panel and the lower polarizing plate.

5. The VA-LCD according to claim 1, wherein
said first retardation film (+A-plate and −A-plate) has a reversed wavelength dispersion in which retardation is increased in proportion to the increase of a wavelength in the range of visible rays; and
the total thickness retardation ($R_{-C} + R_{VA}$) including the thickness retardation of said second retardation film and the thickness retardation of the VA-panel is in the range of −10 nm to −180 nm, being proportional to a wavelength in the range of visible rays.

6. The VA-LCD according to 5, wherein
said first retardation film (+A-plate) has an in-plane retardation ($R_A(550)$) at a wavelength of 550 nm, which is in the range of 250 nm to 500 nm, and said first retardation film (−A-plate) has an in-plane retardation ($R_A(550)$) at a wavelength of 550 nm, which is more than −250 nm; and
said second retardation film (−C-plate) has a thickness retardation ($R_{-C}(550)$) at a wavelength of 550 nm, which is in the range of −500 nm to −180 nm, and the absolute value ($|R_{-C}(550)|$) thereof, which is larger than the absolute value ($|R_{VA}(550)|$) of the thickness retardation of the VA-panel.

7. The VA-LCD according to 5, wherein
the ratio ($R_{450}/R_{550}$) of the thickness retardations of said second retardation film (−C-plate) is smaller than that of the VA-panel; and
the ratio ($R_{550}/R_{550}$) of the thickness retardations of said second retardation film (−C-plate) is larger than that of the VA-panel, wherein said $R_{450}$, $R_{550}$ and $R_{650}$ represent thickness retardations of said second retardation film (−C-plate) at wavelengths of 450 nm, 550 nm and 650 nm, respectively.

8. The VA-LCD according to 5, wherein directors of liquid crystalline polymers of the VA-panel, under the condition that no voltage is applied to the VA-panel, have a pretilt angle in the range of 75° to 90° between the upper and lower glass substrates.

9. The VA-LCD according to claim 8, wherein said pretilt angle is in the range of 87° to 90°.

10. The VA-LCD according to claim 8, wherein said pretilt angle is in the range of 89° to 90°.

11. The VA-LCD according to claim 5, wherein a liquid crystalline layer formed on said VA-panel has a retardation in the range of 80 nm to 400 nm at a wavelength of 550 nm.

12. The VA-LCD according to claim 11, wherein a liquid crystalline layer formed on said VA-panel has a retardation in the range of 80 nm to 300 nm at a wavelength of 550 nm.

13. The VA-LCD according to claim 5, wherein a rubbed direction of the liquid crystals injected into said VA-panel has an angle of 45° with the optical absorption axes of said polarizing plates.

14. The VA-LCD as set forth in claim 5, wherein
the ratio ($R_{A,450}/R_{A,550}$) of the in-plane retardations of said first retardation film (A-plate) is in the range of 0.6 to 0.9; and
the ratio ($R_{A,550}/R_{A,650}$) of the in-plane retardations of said first retardation film (A-plate) is in the range of 1.1 to 1.5, wherein said $R_{A,450}$, $R_{A,550}$ and $R_{A,650}$ represent in-plane retardations at wavelengths of 450 nm, 550 nm and 650 nm, respectively.

15. The VA-LCD as set forth in claim 5, wherein:
the ratio ($R_{-C,450}/R_{-C,550}$) of the thickness retardations of said second retardation film (−C-plate) is in the range of 0.9 to 1.2; and
the ratio ($R_{-C,550}/R_{-C,650}$) of the thickness retardations of said second retardation film (−C-plate) is in the range of 0.9 to 1.2, wherein said $R_{-C,450}$, $R_{-C,550}$ and $R_{-C,650}$ represent thickness retardations at wavelengths of 450 nm, 550 nm and 650 nm, respectively.

* * * * *